United States Patent
Armstrong

(10) Patent No.: US 12,556,187 B2
(45) Date of Patent: Feb. 17, 2026

(54) ACTIVE PHASE MONITOR FOR CLOCK SWITCHOVER

(71) Applicant: Renesas Electronics America Inc., Milpitas, CA (US)

(72) Inventor: Greg Anton Armstrong, Ottawa (CA)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 18/631,861

(22) Filed: Apr. 10, 2024

(65) Prior Publication Data

US 2025/0323647 A1    Oct. 16, 2025

(51) Int. Cl.
*H03D 3/24* (2006.01)
*H03L 7/08* (2006.01)
*H03L 7/195* (2006.01)

(52) U.S. Cl.
CPC ............ *H03L 7/0807* (2013.01); *H03L 7/195* (2013.01)

(58) Field of Classification Search
CPC ........ H03L 7/0807; H03L 7/195; H03L 7/199
USPC .................................... 375/373–376
See application file for complete search history.

(56) References Cited

U.S. PATENT DOCUMENTS 11,108,400 B1 * 8/2021 Armstrong .............. H03L 7/199

* cited by examiner

*Primary Examiner* — Phuong Phu
(74) *Attorney, Agent, or Firm* — SCULLY, SCOTT, MURPHY & PRESSER, P.C.

(57) ABSTRACT

Systems and methods for synchronizing networks are described. A phase monitor circuit can determine at least one phase offset among a plurality of reference clock signals. A timing circuit can generate an output clock signal using a primary reference clock. The primary reference clock can be among the plurality of reference clock signals. The timing circuit can determine failure of the primary reference clock. The timing circuit can, in response to the failure of the primary reference clock, generate the output clock signal using a specific phase offset and a secondary reference clock for the PLL. The specific phase offset can be among the at least one phase offset determined by the phase monitor circuit, the specific phase offset is between the primary reference clock and the secondary reference clock, and the secondary reference clock can be among the plurality of reference clock signals.

20 Claims, 6 Drawing Sheets

ACTIVE PHASE MONITOR FOR CLOCK SWITCHOVER

BACKGROUND

The present disclosure relates in general to semiconductor devices and, more particularly, to timing circuits that can implement an active phase monitor for clock switchover.

A timing circuit including transceivers and clock circuits can be connected to multiple networks to synchronize the multiple networks. The timing circuit can include multiple phase-locked loops, such as analog phase-locked loops (APLL) and digital phase-locked loops (DPLL). An APLL can include an analog phase detector, charge pump, loop filter, and voltage-controlled oscillator (VCO) in a feedback loop. A DPLL can include a digital phase detector and loop filter, and a digital controlled oscillator (DCO). Digital phase-locked loops are typically smaller than APLLs, due to the inclusion of digital phase detector & loop filter.

SUMMARY

In one embodiment, a semiconductor device for network synchronization is generally described. The semiconductor device can include a phase-locked loop (PLL) and a phase monitor circuit. The phase monitor circuit can be configured to determine at least one phase offset among a plurality of reference clock signals. The PLL can be configured to generate an output clock signal using a primary reference clock for the PLL. The primary reference clock can be among the plurality of reference clock signals. The PLL can be further configured to determine failure of the primary reference clock. The PLL can be further configured to, in response to the failure of the primary reference clock, generate the output clock signal using a specific phase offset and a secondary reference clock for the PLL. The specific phase offset can be among the at least one phase offset determined by the phase monitor circuit, the specific phase offset is between the primary reference clock and the secondary reference clock, and the secondary reference clock can be among the plurality of reference clock signals.

In one embodiment, a device for network synchronization is generally described. The device can include a timing circuit and a plurality of transceivers. The timing circuit can include at least a digital phase-locked loop (DPLL). The plurality of transceivers can be configured to recover a plurality of reference clock signals. The plurality of transceivers can be further configured to transmit the plurality of reference clock signals to the timing circuit. The DPLL can be configured to receive the plurality of reference clock signals. The DPLL can be further configured to determine at least one phase offset among a plurality of reference clock signals. The DPLL can be further configured to generate an output clock signal using a primary reference clock for a phase-locked loop (PLL) in the DPLL. The primary reference clock can be among plurality of reference clock signals. The DPLL can be further configured to determine failure of the primary reference clock. The DPLL can be further configured to, in response to the failure of the primary reference clock, generate the output clock signal using a specific phase offset and a secondary reference clock for the PLL. The specific phase offset can be among the at least one phase offset determined by the DPLL, the specific phase offset is between the primary reference clock and the secondary reference clock, and the secondary reference clock can be among the plurality of reference clock signals.

In one embodiment, a method for network synchronization is generally described. The method can include receiving a plurality of reference clock signals. The method can further include determining at least one phase offset among the plurality of reference clock signals. The method can further include generating an output clock signal using a primary reference clock among the plurality of reference clock signals. The method can further include determining failure of a primary reference clock for a phase-locked loop (PLL). The method can further include, in response to the failure of the primary reference clock, generating the output clock signal using a specific phase offset and a secondary reference clock for the PLL. The specific phase offset can be among the at least one phase offset, the specific phase offset is between the primary reference clock and the secondary reference clock, and the secondary reference clock can be among the plurality of reference clock signals.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
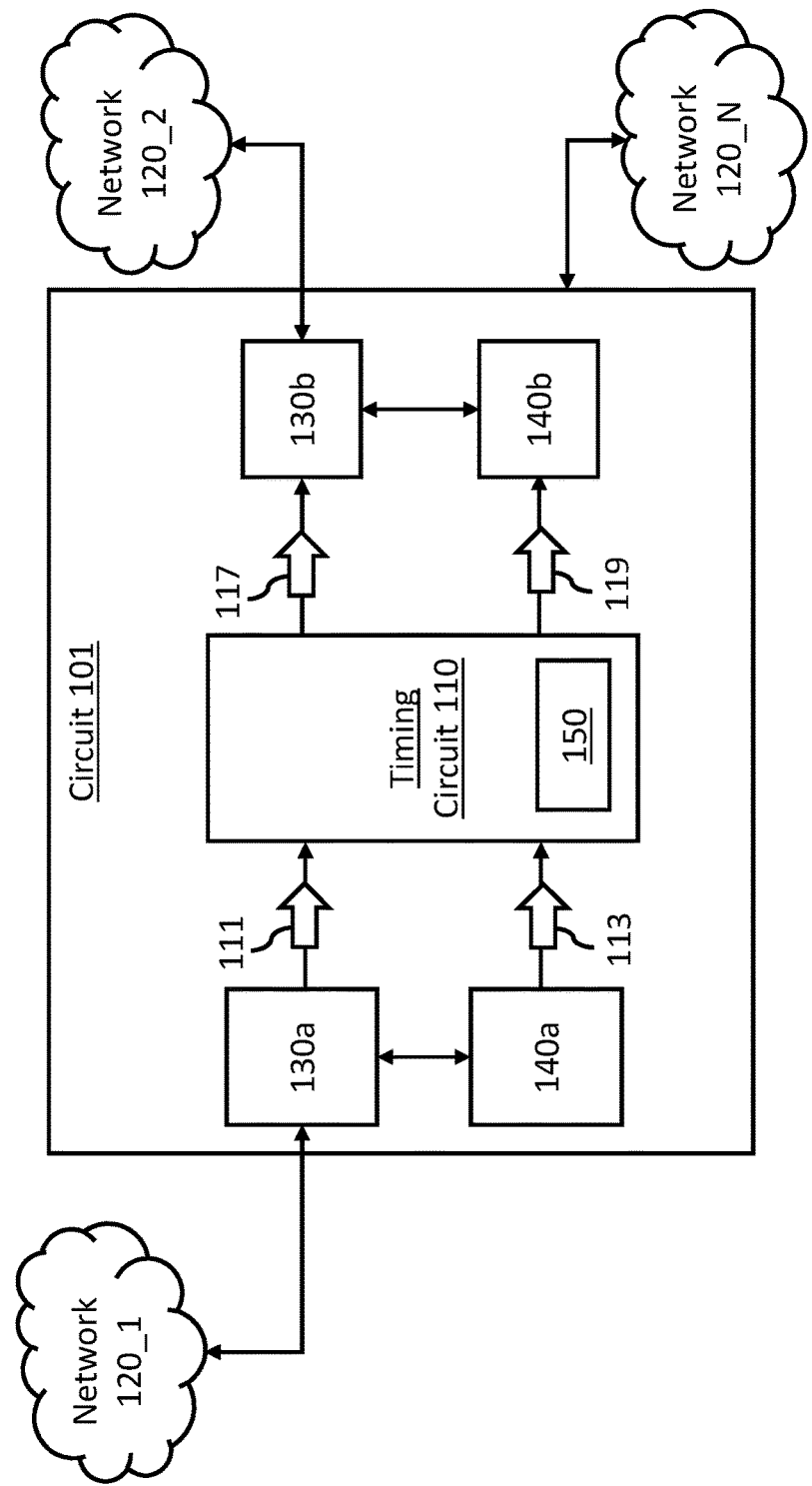
FIG. 1 is a block diagram of an example system for active phase monitor for clock switchover in one embodiment.

FIG. 1 is a block diagram of an example system for active phase monitor for clock switchover in one embodiment. System 100 can include a network circuit 101 and a plurality of networks, or N networks 120_1, 120_2, . . . , 120_N. Network circuit 101 can be an integrated circuit (IC) implement a telecommunications circuit. In an example, the circuit 101 may be implemented as a single IC or as a number of ICs on a printed circuit board (e.g., a network card, server blade, etc.). By way of example, network circuit 101 can implement a portion of a telecommunications network circuit. In another example, network circuit 101 can be implemented as one or more components of a Synchronous Ethernet (e.g., SyncE) switch and/or a router box (e.g., telecommunications device). System 100 can be implemented to synchronize multiple networks (e.g., two or more) networks 120_1-120_N. The number of networks 120_1 to 120_N can be arbitrary depending on a desired implementation of system 100.

In examples where network circuit 101 is being implemented as a switch and/or router, such as a SyncE switch and/or router. network circuit 101 can include one or more transceivers, such as transceivers 130a, 130b, one or more precision timing protocol (PTP) modules, such as PTP modules 140a, 140b, and a timing circuit 110. Each one of transceivers 130a, 130b can be, for example, an Ethernet physical layer transceiver chip. In an example shown in FIG. 1, network 20a can be connected to transceiver 130a and network 20b can be connected to transceiver 130b. Transceiver 130a can be connected to PTP module 140a and timing circuit 110. Transceiver 130b can be connected to PTP module 140b and timing circuit 110. Transceiver 130a can be configured to send data to, and/or receive data from, network 120_1, PTP module 140a and timing circuit 110. Transceiver 130b can be configured to send data to, and/or receive data from, network 120_2, PTP module 140b and timing circuit 110. Each one of transceivers 130a, 130b can be configured to generate and/or receive a clock signal under the SyncE protocol.

Timing circuit 110 can implement a network card and/or a network circuit board. Timing circuit 110 can be configured to synchronize a timing of communication signals transmitted and/or received using one or more communication protocols. In some embodiments, the timing circuit 110 can be implemented as a component of a SyncE router and/or switch (e.g., circuit 101). In one example, timing circuit 110 can be used to implement a synchronous Ethernet Wide Area Network (WAN). In some embodiments, timing circuit 110 can be implemented to facilitate synchronous communication in a digital subscriber line access multiplexer (DSLAM). In an aspect, transceivers 130a, 130b, PTP modules 140a, 140b, and/or timing circuit 110 can be deployed throughout a telecommunications network. In one example, the transceivers 130a, 130b, the PTP modules 140a, 140b and/or the timing circuit 110 can be deployed in a road-side cabinet and/or a server rack. In examples where network circuit 101 implements a SyncE switch and/or router box, networks 120_1 to 120_N can be coupled to one another.

In an example, networks 120_1 to 120_N can implement a number of local area networks (LANs) having operations that may be synchronized with one another. In various embodiments, networks 120_1 to 120_N can include networks based on time division multiplexing (TDM) (e.g., synchronous optical networks (SONET), synchronous digital hierarchy (SDH) network, or plesiochronous digital hierarchy (PDH) networks), and/or Ethernet-based packet networks. The networks 120_1 to 120_N can be configured to facilitate delivery of a variety of communication services. Each one of PTP modules 140a, 140b can implement an IEEE 1588 compliant packet-based timing scheme. In an example, PTP module 140a can implement a slave clock and PTP module 140b can implement a master clock, thus PTP module 140b has a higher hierarchy than PTP module 140a. PTP module 140b can initiate transmission of synchronization messages to slave clocks (e.g., PTP module 140a) and determines the time base for the PTP slave clocks lower in hierarchy.

In the example shown in FIG. 1, network 120_1 can be a transmitting network and one or more of the networks 120_2 to 120_N can be receiving networks. Network 120_1 can transmit data to one or more of the networks 120_2 to 120_N. In an aspect, network 120_1 being implemented as a transmitting network can function as a timing source and the rest of the networks 120_2 to 120_N can be synchronized to the timing source. In order for the data to be accurately transmitted to one or more of the networks 120_2 to 120_N, timing circuit 110 can synchronize the networks 120_1 to 120_N. When networks 120_1 is a transmitting network, transceivers 30a can recover a physical clock 111 from data being provided by network 120_1. In one embodiment, recovered physical clock 111 can be a SyncE physical clock signal. Transceiver 130a can send the recovered physical clock 111 to timing circuit 110. PTP module 140a can be implemented as a PTP slave module or PTP slave clock and can send a PTP phase 113 to timing circuit 110. PTP phase 113 can be an internal reference clock, such as a PTP phase clock signal. Timing circuit 110 can generate a 1 Pulse Per Second (1PPS) signal 119 using PTP phase 113. Timing circuit 110 can generate an output clock signal 117 that is frequency and/or phase locked with physical clock 111. Transceiver 130b can be configured to receive output clock signal 117 from timing circuit 110, where output clock signal 117 can be a SyncE transmit clock signal. The output clock signal 117, or SyncE transmit clock signal, can communicate a SyncE transmit clock for broadcasting the data provided by network 120_1 to one or more of the receiving networks 120_2 to 120_N.

PTP modules 140a, 140b can be configured to provide precise time over an Internet computing network. For example, PTP modules 140a, 140b can be interconnected by switches (e.g., dedicated, high-speed LAN segments interconnected by switches) and/or can synchronize device clocks over the Internet computing network. In the example shown in FIG. 1, PTP module 140a can implement a PTP slave module. PTP module 140a, as a PTP slave module, can send PTP phase 113 to timing circuit 110, where PTP phase 113 can be a PTP phase signal. PTP module 140b can implement a PTP master module. PTP module 140b, as a PTP master module, can receive 1PPS signal 119 that can be a 1PPS generated by timing circuit 110. Timing circuit 110 can use physical clock 111 and PTP phase 113 to generate output clock signal 117 and the 1PPS signal 119 can be used to synchronize the networks 120_1 to 120_N (e.g., a wide area network).

Figure 2:
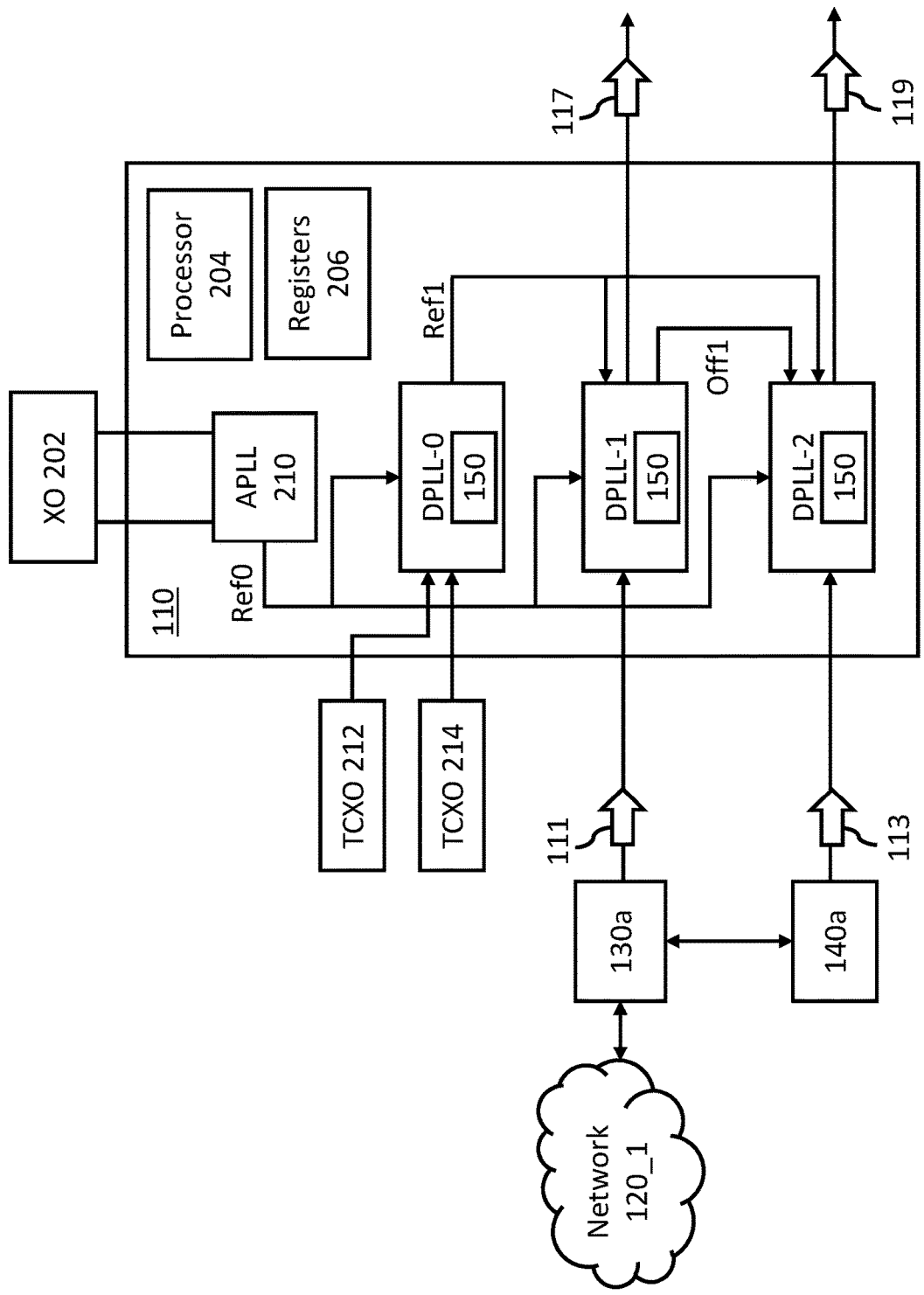
FIG. 2 is a block diagram illustrating details of a timing circuit in one embodiment.

To be described in more detail in FIG. 2, timing circuit 110 can include an analog phase-locked loop (APLL) and multiple digital phase-locked loops (DPLLs). The APLL can implement a local system clock that provides a common clock signal Ref0 to the multiple DPLLs in timing circuit 110. The multiple DPLLs can be configured to generate an output signal that has a phase related to an input signal being provided to timing circuit 110. One or more of the multiple DPLLs configured as a sourcing DPLL and one of the multiple DPLLs can be configured as a receiving DPLL. Timing circuit 110 can be configured to select which of the sourcing DPLLs sources the receiving DPLL. The sourcing DPLLs can provide a redundant source for the receiving DPLL and enable synchronous communication over multiple networks. One of the sourcing DPLLs can be selected (e.g., by timing circuit 110) as a primary reference clock for the receiving DPLL, and another sourcing DPLL among the sourcing DPLLs can be selected as a secondary reference clock for the receiving DPLL.

In an aspect, when the primary reference clock fails, timing circuit 110 can switch to the secondary reference clock for sourcing the receiving DPLL. The switching to the secondary reference clock can result in a relatively large phase transient on the receiving DPLL. When the primary reference clock experiences noise or transients due to the failure, the DPLL of the failed reference clock can be isolated as fast as possible. A phase offset between the failed primary reference clock and the second reference clock needs to be made such that the phase offset can be absorbed by a phase detector prior to isolating the primary loop DPLL. Absorption of the phase offset can allow adjustments to be made to the receiving DPLL when the secondary reference clock is sourcing the receiving DPLL. However, for low frequency clocks, the phase offset can be relatively large, such as 180 degrees. This relatively large phase offset can negatively impact the precision of the phase offset measurement, and may delay the reference switch (or clock switchover) by multiple cycles of the input clock (e.g., in the order of 100s of microseconds or milliseconds). This could cause a large phase transient on the output of the receiving DPLL due to remaining in holdover for that time period, and means large offsets may occur between the new input and the feedback clock. The large phase transient can cause additional offsets to occur between the new input (e.g., the secondary reference clock) and the feedback clock at the output.

To prevent the large phase transient on the output of the receiving DPLL, some conventional techniques can use a reset circuit to reset a feedback clock divider of the receiving DPLL in order to limit inaccuracy in measuring the phase offset between the primary reference clock and the secondary reference clock. However, the phase offset measurement and the process to reset the feedback clock divider are performed in response to the primary reference clock failure. In other words, occurrence of the primary clock failure triggers the phase offset measurement and the reset process. The phase offset measurement and the reset process can prolong the holdover time of the receiving DPLL. To be described in more detail below, each DPLL in timing circuit 110 can include a circuit 150 that is configured to perform active phase monitoring. The active phase monitoring includes measuring phase offsets between different reference clocks prior to primary reference clock failure. The measured phase offsets can be stored and can be provided to the phase detector for absorption in response to primary reference clock failure. Thus, when primary reference clock fails, the phase offset determination does not need to be performed and the holdover time of the receiving DPLL can be reduced.

FIG. 2 is a block diagram illustrating details of a timing circuit in one embodiment. Description of FIG. 2 can reference components that are shown in FIG. 1. Details of timing circuit 110 are shown in FIG. 2. Timing circuit 110 can include multiple analog phase-locked loops (APLL) and digital phased-lock loops (DPLL) configured to generate frequency locked and/or phase locked signals. In the example shown in FIG. 2, timing circuit 110 can receive physical clock 111, PTP phase 113 and outputs from TXCOs 212, 214, where the outputs from TXCOs 212, 214 can be reference clock signals, and timing circuit 110 can output clock signal 117 and 1PPS signal 119.

A combination of analog phase-locked loop (APLL) and digital phased-lock loop (DPLL) can form a mixed signal phase-locked loop (PLL) that reduces jitter at the output of timing circuit 110. Timing circuit 110 can include a processor 204, a plurality of storage devices such as memories and registers 206, one or more DPLLs such as DPLL-0, DPLL-1 and DPLL-2. APLL 210, in combination with a crystal oscillator 202 ("XO 202"), can implement a local crystal oscillator-based system clock. In an aspect, crystal oscillators can provide relatively good short-term stability (e.g., low jitter) but can be sensitive to temperature variations. As shown in FIG. 2, APLL 210 can provide a real-time physical clock Ref0 as a common clock signal to all of the DPLLs in timing circuit 110 and/or may be seen as a noise source within the DPLLs.

Each one of the DPLLs in timing circuit 110 can be configured to generate an output signal that is phase locked to one of the input signals being provided to timing circuit 110. One or more of the DPLLs in timing circuit 110 can be configured as a sourcing DPLL. In the example shown in FIG. 2, DPLL-0 and DPLL-1 can be configured as sourcing DPLLs. One of the DPLLs in timing circuit 110 can be configured as a receiving DPLL. In the example shown in FIG. 2, DPLL-2 can be configured as a receiving DPLL. Timing circuit 110 can be configured to select which of the sourcing DPLLs, such as DPLL-0 and DPLL-1, sources the receiving DPLL-2. The sourcing DPLL-0 and DPLL-1 can provide a redundant source for the receiving DPLL-2 and can enable synchronous communication over multiple networks.

One or more temperature compensated crystal oscillators (TXCO) 212, 214 can be included in circuit 101 or in system 100 (outside of circuit 101). TCXOs 212, 214 can provide a redundant TCXO system. In one example, timing circuit 110 can include a multiplexer configured to select between the outputs of TCXOs 212, 214, for use as a reference clock. The redundant TCXO system can be used to select one of the TCXOs 212, 214 as a backup in the case that one of the TCXOs 212, 214 fails. The TCXOs 212, 214 can provide a precision frequency source with a relatively high level of temperature stability.

Processor 204 can be configured to process input and/or internal signals of timing circuit 110 and can generate and/or receive signals to/from the various components of timing circuit 110. In some embodiments, processor 204 can be configured to monitor a status and/or activity of the DPLLs in timing circuit 110. By way of example, processor 204 can be configured to detect reference switch in a sourcing DPLL. For example, using the processor 204 may enable the system 100 to know beforehand that a re-arrangement is upcoming. The processor 204 may provide a-priori information about re-arrangement to inter-DPLL coupling and/or reference switches. In some embodiments, processor 204 can implement an internal processor and/or a state machine. The implementation of processor 204 can vary and can be dependent on a desired implementation of system 100. Registers 206 can be used for controlling and/or selecting various functionality of timing circuit 110. Operations of APLL 210 and the DOLLs in timing circuit 110 can be based on data being stored in registers 206. In some embodiments, registers 206 can be implemented as components of processor 204. In the example shown in FIG. 2, registers 206 can be implemented as a separate component from processor 204. In one example, the selection and/or state of the registers 206 can be controlled by processor 204.

In the example shown in FIG. 2, DPLL-O can receive the common clock signal Ref0 from APLL 210 and generate a compensated clock signal using the outputs from TXCO 212, 214. By way of example, the bandwidth of DPLL-0 may be within a range that can track the temperature variations (e.g., wander) in ref0 provided by APLL 210 and can suppress these variations on Ref0 when generating Ref1. Also, the range of the bandwidth of DPLL-O can prevent jitter from outputs of any one of TXCO 212, 214 and XO 202. DPLL-1 can lock to one of the outputs from TXCO 212, 214. DPLL-0, as a sourcing DPLL, can output compensated clock signal Ref1 to other DPLLs in timing circuit 110, such as DPLL-1 and to DPLL-2. In an aspect, the common clock signal Ref0 based on XO 202 can provide compensation on phase noise performance while outputs from TXCO can provide compensation on temperature stability. Thus, compensated clock signal Ref1 from DPLL-0 can provide overall holdover stability. Also, in the example shown in FIG. 2, DPLL-1 can lock to the physical clock 111 and can suppress jitter and/or wander while DPLL-2 can generate the 1PPS signal 119 from the PTP phase 113. DPLL-2 can lock to the PTP phase 113. DPLL-1, as a sourcing DPLL, can provide the frequency offset Off1 of the physical clock 111 to DPLL-2 and thereby stabilizes the 1PPS signal 119 generated by DPLL-2. Along with receipt of the compensated clock signal Ref1, DPLL-2 can be stabilized by one or more of the sourcing DPLLs, including DPLL-0 and DPLL-1 while still having relatively low output jitter levels due to XO 202.

Each one of the DPLLs, regardless of whether it is configured as a sourcing DPLL or a receiving DPLL, can include multiple input interfaces for receiving multiple reference clock signals that can be different and/or redundant. For example, DPLL-0 can receive redundant TXCO outputs from TXCO 212, 214 and DPLL-2 can receive multiple copies of PTP phase 113. Each one of the DPLLs in timing circuit 110 can lock to a primary reference clock and can switch to another, or a secondary, reference clock if the primary reference clock fails. Each one of the DPLLs in timing circuit 110 can include a copy of circuit 150 that can perform active phase monitoring, prior to primary reference clock failure, to determine phase offsets among the different reference clocks being received by the corresponding DPLL. The phase offsets determined prior to primary reference clock failure can be stored in, for example, registers 206 and can be extracted for phase offset absorption during reference switching to the secondary reference clock.

Figure 3:
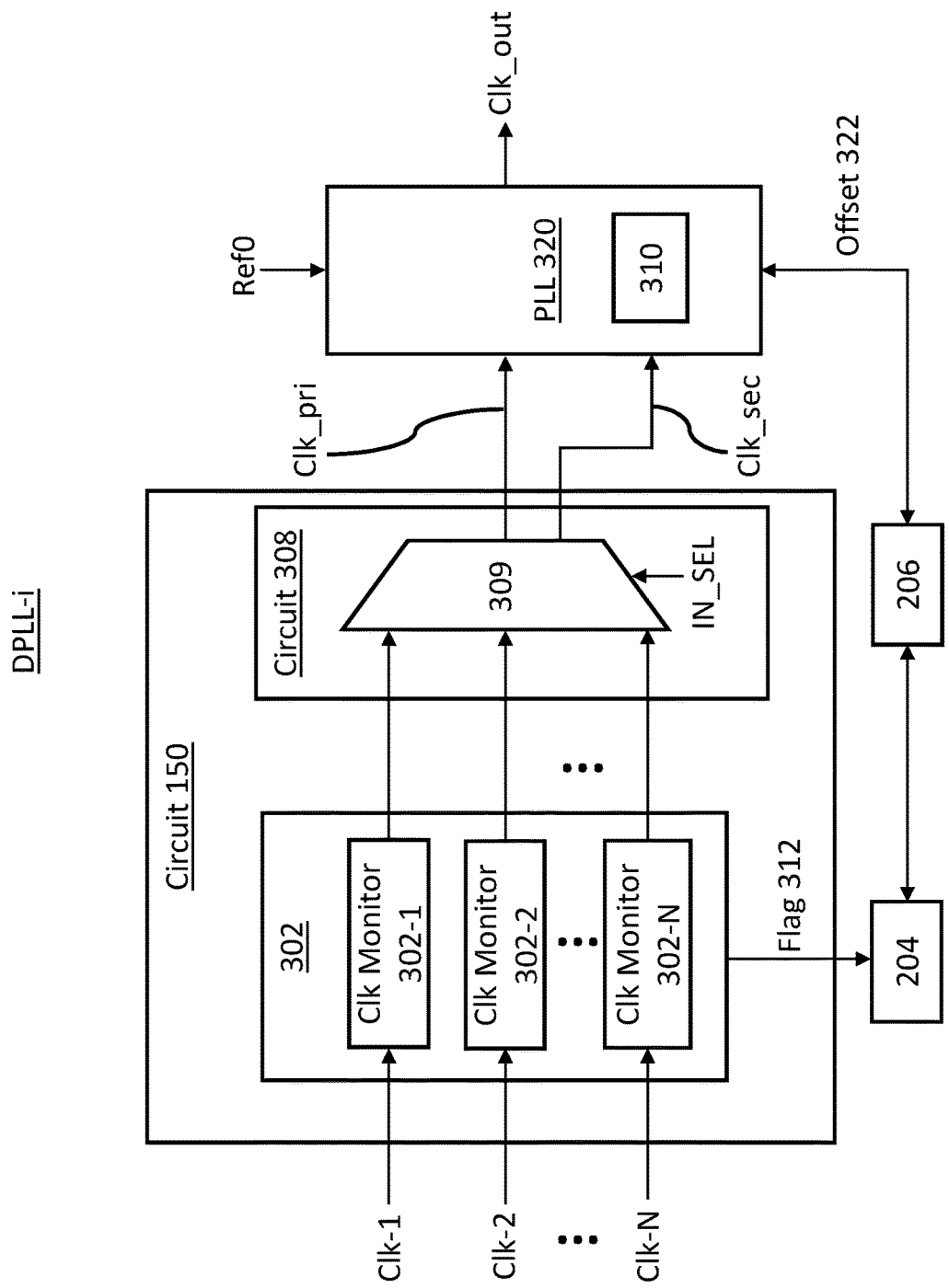
FIG. 3 is a block diagram illustrating an example implementation of a circuit for active phase monitor for clock switchover in one embodiment.

FIG. 3 is a block diagram illustrating another example implementation of a circuit for active phase monitor for clock switchover in one embodiment. Description of FIG. 3 can reference components shown in FIG. 1 to FIG. 3. An example embodiment of one of the DPLLs, DPLL-i, in timing circuit 110 is shown in FIG. 3. DPLL-i can be any one of the DPLLs shown in FIG. 2. In the embodiment shown in FIG. 3, DPLL-i can include circuit 150, a phase monitor circuit 130 and a PLL 320. Phase monitor circuit 310 can be separated from circuit 150 and can be a part of PLL 320. Circuit 150 can receive a plurality of reference clock signals, or reference clocks, labeled as Clk-1, Clk-2, . . . , Clk-N (total of N reference clocks). The reference clocks being received by circuit 150 can be, for example, one or more of the reference clocks shown in FIG. 1 and FIG. 2, such as the physical clock 111, the PTP phase 113, the common clock signal Ref0 from APLL 210, outputs from TXCO 212, 214, compensated clock signal Ref1, or other reference clock signals from other sources internal and/or external to timing circuit 110. DPLL-i can be configured to output an output clock signal Clk_out. The output clock signal Clk_out can be, for example, one or more of the output clocks shown in FIG. 1 and FIG. 2, such as output clock signal 117 and 1PPS signal 119, or other clock signals that can be generated by timing circuit 110.

Circuit 150 can include a plurality of clock monitor circuits 302 and a circuit 308. The number of clock monitor circuits 302 can be equivalent to the number of inputs of circuit 150, or the number of reference clocks being received by circuit 150. Each one of clock monitor circuits 302 can be configured to monitor its input reference clock signal. For example, clock monitor 302-1 monitors Clk-1, clock monitor 302-2 monitors Clk-2, and so on. Clock monitor circuits 302 can be configured to monitor the reference clocks in parallel to determine the status of the reference clocks. Further, each one of clock monitor circuits 302 can be configured to transmit one of the respective input clock signals CLK_A-CLK_N to circuit 308 for selection of a reference clock to be forwarded to PLL 320. In an example, clock monitor 302-1 can monitor the status of clock signal Clk-1 and transmit Clk-1 to an input of circuit 308 and clock monitor 302-2 can monitor the status of clock signal Clk-2 and transmit Clk-2 to another input of circuit 308. Circuit 308 can be configured to select one of the reference clocks being outputted by clock monitor circuits 302. In one embodiment, circuit 308 can include a clock selection circuit 309 configured to select, based on a set of selection signals SEL_IN, one or more reference clocks being outputted by clock monitors 302. In one embodiment, the selection signal IN_SEL can be provided by processor 204 and/or can be loaded from registers 206.

The reference clock selected by circuit 308 can be provided to PLL 320 as a primary reference clock Clk_pri. DPLL-i can be locked to primary reference clock Clk_pri selected by circuit 308. The unselected reference clocks may be alternate and/or redundant clock signals. One of the unselected reference clocks can be selected (e.g., by clock selection circuit 309) as a secondary input clock signal Clk_sec. In one embodiment, clock selection circuit 309 can include at least one multiplexer (MUX), such as a first MUX can be used for selecting a reference clock to be Clk_pri and another MUX can be used for selecting an unselected reference clock as Clk_sec. In one embodiment, selection of Clk_pri and/or Clk_sec can be based on the set of selection signals IN_SEL provided by processor 204. In one embodiment, selection signal IN_SEL can include a first selection signal for selecting Clk_pri and a second selection signal for selecting Clk_sec. The secondary reference clock Clk_sec can replace the primary reference clock Clk_pri if Clk_pri fails. By way of example, Clk-1 can be a primary reference clock and Clk-2 can be a secondary reference clock, such that by default, DPLL-i generates and outputs Clk_out that is phase locked to Clk-1. After a switchover time period of the reference switch from Clk_pri to Clk_sec, the secondary reference clock Clk_sec becomes the new primary reference clock for DPLL-i and can be outputted as Clk_pri by circuit 150.

The reference clocks Clk-1 to Clk-N can be provided to clock selection circuit 309. Clock selection circuit 309 can select one of the reference clocks as Clk_pri and select one of the unselected reference clocks as Clk_sec. Clock selection circuit 309 can output Clk_pri and Clk_sec to PLL 320. Phase monitor circuit 310 in PLL 320 can include one or more phase detectors configured to determine phase offset 322 between the selected Clk_pri and Clk_sec. The phase offset 322 determined by phase monitor circuit 310 can be stored in registers 206. In one embodiment, phase monitor circuit 310 can actively or continuously monitor and detect phase offset between Clk_pri and Clk_sec provided by clock selection circuit 309 such that even if Clk_pri and/or Clk_sec are changed to other reference clocks, the stored phase offsets in registers 206 can be updated.

By way of example, Clk-1 is selected by clock selection circuit 309 as Clk_pri and Clk-2 is selected by clock selection circuit 309 as Clk_sec. Clock monitor 302-1 can detect a signal failure at Clk-1 and send a flag 312 to processor 204 to notify processor 204 of a primary reference clock failure. In one embodiment, the flag 312 can also be provided to PLL 320 such that PLL 320 can detect the failure of Clk_pri. In response to the failure of Clk-1, DPLL-i can enter an internal holdover state that does not assert a holdover alarm either internally or externally. Phase offset 322 between the reference clocks selected as Clk_pri and Clk_sec, which are Clk-1 and Clk-2 in this example, stored in registers 206 can be provided to PLL 320. In one embodiment, processor 204 can control registers 206 and load the phase offset from registers 206 to PLL 320. PLL 320 can align the output clock signal Clk_out with the new primary reference clock, which is Clk-2 or Clk_sec, using the offset phase 322.

By using circuit 150 to monitor the input reference clocks and phase monitor circuit 310 in PLL 320 to predetermine (e.g., determine prior to primary clock failure situations) phase offset between the primary and secondary reference clocks, DPLL-i (or all DPLLs in timing circuit 110) can load the stored phase offset in response to primary reference clock failure for compensating the difference between the selected primary and secondary reference clocks. The loading of stored phase offset is relatively faster than determination or measurement of the phase offset. Thus, when a primary reference clock fails and the DPLL goes into holdover state, the phase offset between the failed primary reference clock and the secondary reference clock can be loaded and absorbed by a phase detector in PLL 320 without a need to determine the phase offset during holdover state, thus reducing the holdover time for reference switch.

Figure 4:
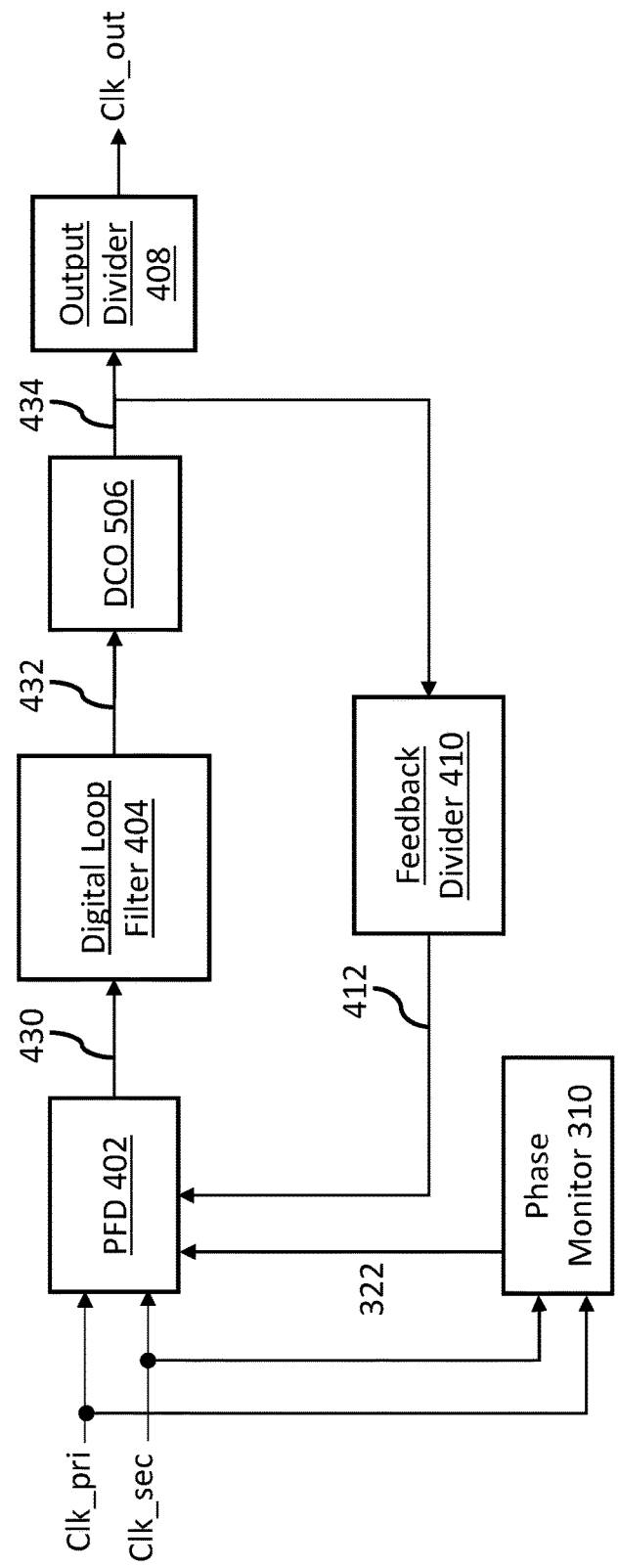
FIG. 4 is a block diagram illustrating another example implementation of a circuit for active phase monitor for clock switchover in one embodiment.

FIG. 4 is a block diagram illustrating the example implementation shown in FIG. 3 in a phase-locked loop in one embodiment. Description of FIG. 4 can reference components shown in FIG. 1 to FIG. 3. In an embodiment shown in FIG. 4, PLL 320 can include phase and frequency detector (PFD) 402, a digital loop filter 404, a digitally-controlled oscillator (DCO) 406, an output divider 408, a feedback divider 410 and phase monitor circuit 310. In one embodiment, PFD 402 can be configured to perform a frequency measurement (e.g., a comparison) of one or more input signals, such as primary reference clock Clk_pri, secondary reference clock Clk_sec and a feedback signal 412 outputted from feedback divider 410. The feedback signal 412 can represent a feedback of the output clock signal Clk_out. PFD 402 can generate an error signal 430 that indicates an amount of error representing a difference between Clk_pri (or the reference clock that the DPLL including the PLL 320 is locked to) and feedback signal 412. In one embodiment, the error signal 430 generated by PFD 402 can be a multi-bit signed phase word (e.g., a phase error signal). The error signal 430 can be provided to the digital loop filter 404. In one embodiment, digital loop filter 404 can be a low pass filter. Digital loop filter 404 can filter high frequencies from error signal 430 received from PFD 402. Digital loop filter 404 can generate a fractional frequency offset (ffo) signal 432. The ffo signal 432 can be a digital signal representing a fraction of a frequency that can be used by the DPLL that includes PLL 320 to pull the output clock signal Clk_out into alignment with Clk_pri.

DCO 406 can be configured to generate a clock signal 434 and DCO 406 can align the clock signal 434 to Clk_pri using the ffo signal 432. DCO 406 can also receive common clock signal Ref0 from APLL 210. Clock signal 434 generated by DCO 406 can be provided as a feedback to feedback divider 410 and/or presented to the output divider 408. Output divider 408 can be configured to generate the output signal Clk_out by dividing the clock signal 434 generated by DCO 406. Dividing the clock signal 434 can enable the output clock signal Clk_out to have frequencies that are multiples of the DCO frequency. The feedback divider 410 can be configured to generate the feedback signal 412 by dividing the clock signal 424 from DCO 406 to the frequency of PFD 402.

Phase monitor circuit 310 can be implemented in PLL 320, as shown in FIG. 3. When phase monitor circuit 310 is implemented in PLL 320, the reference clocks Clk_pri and Clk_sec selected by clock selection circuit 309 can be provided to PFD 402 and phase monitor circuit 310 in PLL 320. Phase monitor circuit 310 can determine phase offset 322 between the selected Clk_pri and Clk_sec and phase offset 322 can be stored in registers 206. Phase monitor circuit 310 can actively or continuously monitor and detect phase offset between Clk_pri and Clk_sec being inputted to PFD 402 such that even if Clk_pri and/or Clk_sec are changed to other reference clocks, the stored phase offsets in registers 206 can be updated. When Clk_pri fails, phase offset 322 that is already predetermined by phase monitor circuit 310 can be provided (e.g., load from registers 206) to PFD 402. PFD 402 can receive phase offset 322 and can generate and update error signal 430 representing a difference between Clk_sec, or Clk-2 in this example, and feedback signal 412. PFD can generate this updated error signal 430 by PLL 320 can align the output clock signal Clk_out with the new primary reference clock, which is Clk-2 or Clk_sec, using the offset phase 322.

In an aspect, the reference switch from Clk_pri to Clk_sec can introduce a large phase transient on the signal CLK_OUT. By way of example, when PLL 320 (or the DPLL that includes PLL 320) locks to Clk_pri, Clk_out or feedback signal 412 can have a phase that deviates from the phase of Clk_pri but is relatively close to Clk_pri. When Clk_pri fails, the Clk_out or feedback signal 412 can still be locked to Clk_pri, thus still deviates but close to Clk_pri, but its deviation from Clk_sec is relatively large when compared to Clk_pri. If the phase offset between Clk_pri and Clk_sec is not taken into consideration, the error signal 430 generated by PFD 402 can indicate a difference between the feedback of Clk_pri and Clk_sec, which introduces a large phase transient at Clk_out. Therefore, the phase offset between Clk_pri and Clk_sec needs to be known in order for PFD 402 to make adjustments when generating error signal 430.

Conventional systems can operate the DPLL in a holdover state and calculate or determine the phase offset between Clk_pri and Clk_sec during the holdover state. The systems and methods described herein can utilize phase monitor circuit 310 to determine the phase offset between Clk_pri and Clk_sec prior to Clk_pri failure such that once the DPLL goes into holdover state, the predetermined phase offset can be loaded to PFD 402, which is relatively faster than a calculation of the phase offset during the holdover state. The predetermination of the phase offset between Clk_pri and Clk_sec can reduce the overall holdover time.

Figure 5:
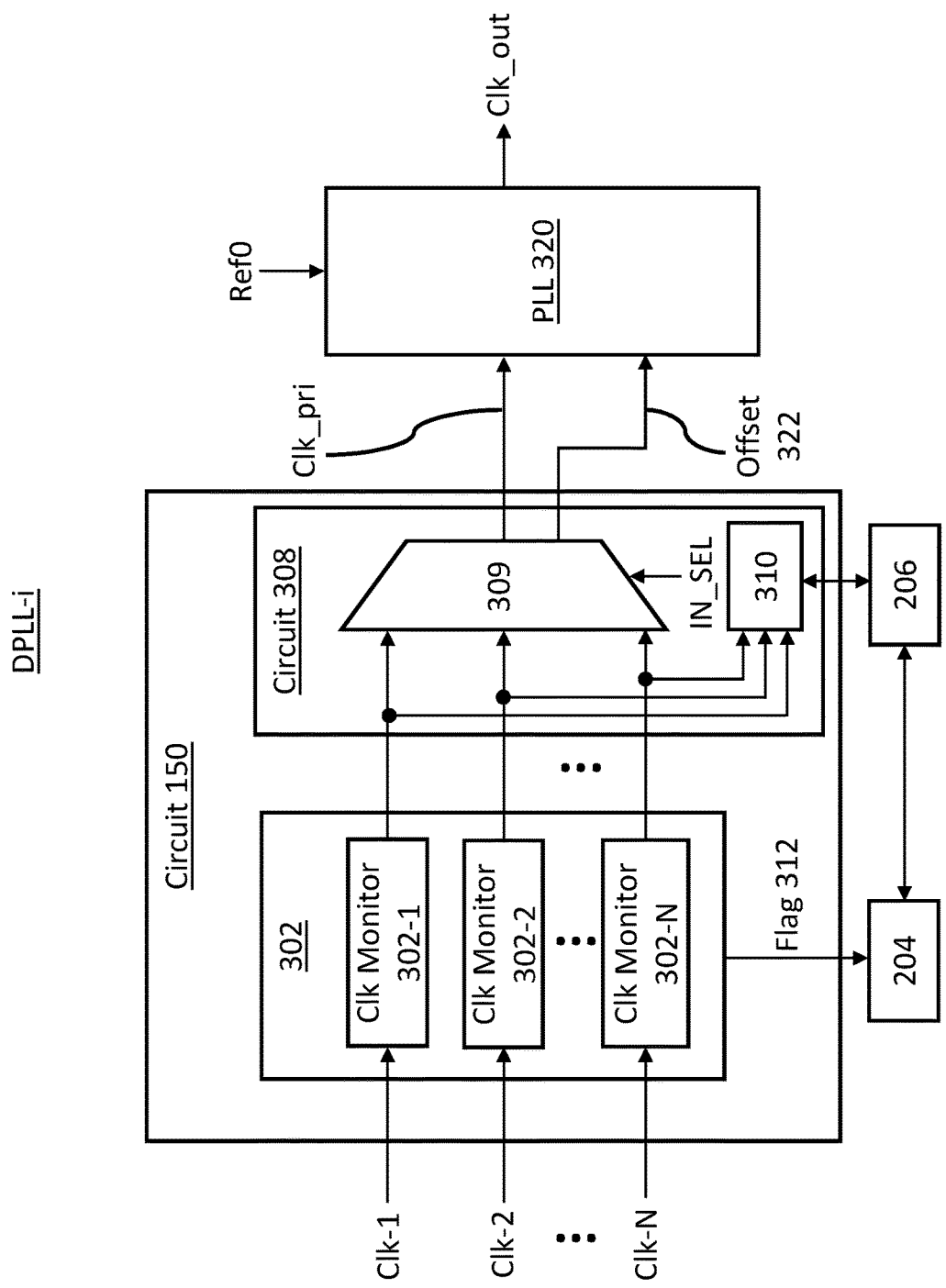
FIG. 5 is a block diagram illustrating the example implementation shown in FIG. 4 in a phase-locked loop in one embodiment.

FIG. 5 is a block diagram illustrating an example implementation of a circuit for active phase monitor for clock switchover in one embodiment. Description of FIG. 5 can reference components that are shown in FIG. 1 to FIG. 4. An example embodiment of one of the DPLLs, DPLL-i, in timing circuit 110 is shown in FIG. 5. DPLL-i can be any one of the DPLLs shown in FIG. 2. In the example embodiment shown in FIG. 5, DPLL-i can include circuit 150 and a PLL 320, and phase monitor circuit 310 can be a part of circuit 308 in circuit 150.

The reference clocks Clk-1 to Clk-N can be provided to both clock selection circuit 309 and to phase monitor circuit 310. Phase monitor circuit 310 can include one or more phase detectors configured to determine phase offsets between every pair of reference clocks among reference clocks Clk-1 to Clk-N. For example, phase monitor circuit 310 can receive the reference clocks Clk-1 to Clk-N and determine a phase offset between Clk-1 and Clk-2, a phase offset between Clk-1 and Clk-N, and so on. The phase offsets determined by phase monitor circuit 310 can be stored in registers 206. In one embodiment, phase monitor circuit 310 can actively or continuously monitor and detect phase offsets for every pair of reference clocks being received by circuit 150 such that even if there are changes to the reference clocks (e.g., new clocks, phase shifts, etc.) the stored phase offsets in registers 206 can be updated.

By way of example, Clk-1 is selected by clock selection circuit 309 as Clk_pri and Clk-2 is selected by clock selection circuit 309 as Clk_sec. Clock monitor 302-1 can detect a signal failure at Clk-1 and send a flag 312 to processor 204 to notify processor 204 of a primary reference clock failure. In one embodiment, the flag 312 can also be provided to PLL 320 such that PLL 320 can detect the failure of Clk_pri. In response to the failure of Clk-1, DPLL-i can enter an internal holdover state that does not assert a holdover alarm either internally or externally. A phase offset 322 between the reference clocks selected as Clk_pri and Clk_sec, which are Clk-1 and Clk-2 in this example, stored in registers 206 can be provided to circuit 308. In one embodiment, processor 204 can control registers 206 and load the phase offset 322 between the selected Clk_pri and Clk_sec from registers 206 to PLL 320. In one embodiment, processor 204 has the information of which reference clock is selected as Clk_sec based on the set of selection signals IN_SEL. PLL 320 can align the output clock signal Clk_out with the new primary reference clock, which is Clk-2 or Clk_sec, using the offset phase 322. Circuit 308 can output the secondary reference clock, which is Clk-2 in this example, as Clk_pri and also output the phase offset 322 to PLL 320 such that PLL 320 can lock Clk_out to Clk-2 while compensating the offset between Clk-1 and Clk2 using phase offset 322 that is already predetermined.

By using circuit 150 to monitor the input reference clocks and predetermine (e.g., determine prior to primary clock failure situations) phase offsets between the input reference clocks, DPLL-i (or all DPLLs in timing circuit 110) can load the stored phase offsets in response to a primary reference clock failure for compensating the difference between the primary and secondary reference clocks. The loading of stored phase offset is relatively faster than determination or measurement of the phase offset. Thus, when a primary reference clock fails and the DPLL goes into holdover state, the phase offset between the failed primary reference clock and the secondary reference clock can be loaded and absorbed by a phase detector in PLL 320 without a need to determine the phase offset during holdover state, thus reducing the holdover time for reference switch.

Figure 6:
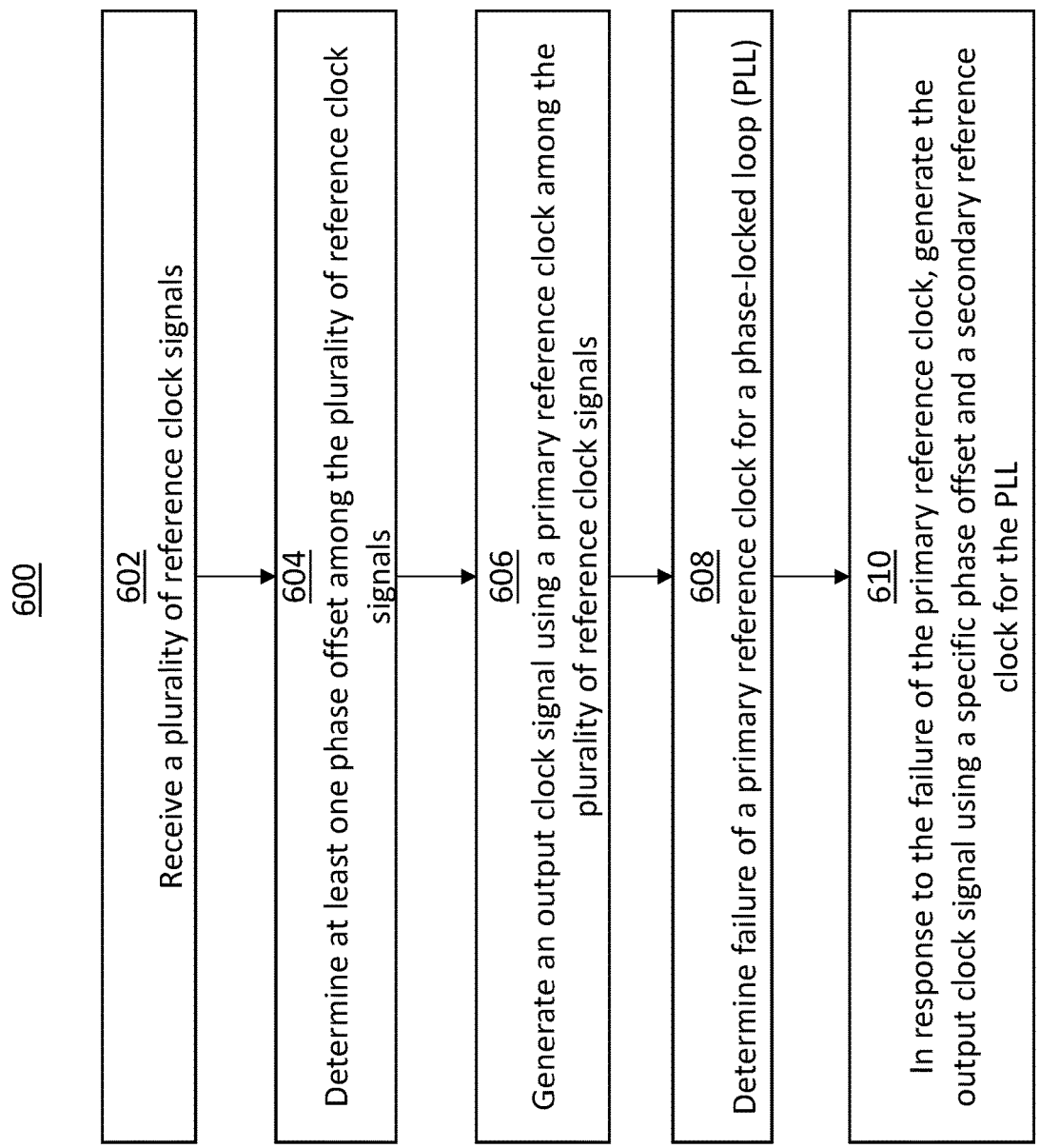
FIG. 6 is a flowchart of an example process that can implement active phase monitor for clock switchover in one embodiment.

FIG. 6 is a flowchart of an example process that can implement active phase monitor for clock switchover in one embodiment. Process 600 in FIG. 6 may be implemented using, for example, timing circuit 110 discussed above. An example process may include one or more operations, actions, or functions as illustrated by one or more of blocks 602, 604, 606, 608, and/or 610. Although illustrated as discrete blocks, various blocks may be divided into additional blocks, combined into fewer blocks, eliminated, performed in different order, or performed in parallel, depending on the desired implementation.

Process 600 can be performed by a timing circuit (e.g., timing circuit 110) to synchronize a plurality of networks. Process 600 can begin at block 602. At block 602, the timing circuit can receive a plurality of reference clock signals. Process 600 can proceed from block 602 to block 604. At block 604, the timing circuit can determine at least one phase offset among the plurality of reference clock signals. In one embodiment, the timing circuit can determine the at least one phase offset by determining phase offset between every pair of reference clock signals among the plurality of reference clock signals. In one embodiment, the timing circuit can determine the at least one phase offset is performed prior to a holdover state of the PLL.

Process 600 can proceed from block 604 to block 606. At block 606, the timing circuit can generate an output clock signal using a primary reference clock among the plurality of reference clock signals. Process 600 can proceed from block 606 to block 608. At block 608, the timing circuit can determine failure of a primary reference clock for a phase-locked loop (PLL). Process 600 can proceed from block 608 to block 610. At block 610, the timing circuit can, in response to the failure of the primary reference clock, generate the output clock signal using a specific phase offset and a secondary reference clock for the PLL. The specific phase offset can be among the at least one phase offset and the specific phase offset is between the primary reference clock and the secondary reference clock. The secondary reference clock can also among the plurality of reference clock signals.

In one embodiment, the timing circuit can receive the primary reference clock and the secondary reference clock. The timing circuit can determine the specific phase offset. The timing circuit can, in response to failure of the primary reference clock, input the specific phase offset to a phase detector in the PLL. In one embodiment, the timing circuit can store the at least one phase offset in a plurality of registers. In response to failure of the primary reference clock, the specific phase offset can be loaded from one of the plurality of registers. In one embodiment, the timing circuit can select a first reference clock signal among the plurality of reference clock signals as the primary reference clock for the PLL and select a secondary reference clock among the plurality of reference clock signals as the secondary reference clock for the PLL.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
a phase-locked loop (PLL); and
a phase monitor circuit configured to determine at least one phase offset among a plurality of reference clock signals,
wherein the PLL is configured to:
generate an output clock signal using a primary reference clock for the PLL, wherein the primary reference clock is among the plurality of reference clock signals;
determine a failure of the primary reference clock; and
in response to the failure of the primary reference clock, generate the output clock signal using a specific phase offset and a secondary reference clock for the PLL, wherein the specific phase offset is among the at least one phase offset determined by the phase monitor circuit prior to the failure of the primary reference clock, the specific phase offset is between the primary reference clock and the secondary reference clock, and the secondary reference clock is among the plurality of reference clock signals.

2. The semiconductor device of claim 1, wherein the at least one phase offset comprises phase offset between every pair of reference clock signals among the plurality of reference clock signals.

3. The semiconductor device of claim 1, wherein the phase monitor circuit is implemented in the PLL.

4. The semiconductor device of claim 1, wherein the phase monitor circuit is configured to:
receive the primary reference clock;
receive the secondary reference clock;
determine the specific phase offset; and
in response to failure of the primary reference clock, provide the specific phase offset to a phase detector in the PLL.

5. The semiconductor device of claim 1, wherein:
the phase monitor circuit is configured to store the at least one phase offset in a plurality of registers prior to the failure of the primary reference clock; and
in response to failure of the primary reference clock, the specific phase offset is loaded from one of the plurality of registers to the PLL.

6. The semiconductor device of claim 1, further comprising a clock selection circuit configured to:
select a first reference clock signal among the plurality of reference clock signals as the primary reference clock for the PLL; and
select a secondary reference clock among the plurality of reference clock signals as the secondary reference clock for the PLL.

7. The semiconductor device of claim 6, wherein the phase monitor circuit and the clock selection circuit are implemented in the same circuit.

8. The semiconductor device of claim 1, wherein the PLL and the phase monitor circuit are parts of a digital phase-locked loop (DPLL).

9. A device comprising:
a timing circuit including at least a digital phase-locked loop (DPLL); and
a plurality of transceivers configured to:
recover a plurality of reference clock signals; and
transmit the plurality of reference clock signals to the timing circuit,
wherein the DPLL is configured to:
receive the plurality of reference clock signals;
determine at least one phase offset among a plurality of reference clock signals;
generate an output clock signal using a primary reference clock for a phase-locked loop (PLL) in the DPLL, wherein the primary reference clock is among the plurality of reference clock signals;
determine a failure of the primary reference clock; and
in response to the failure of the primary reference clock, generate the output clock signal using a specific phase offset and a secondary reference clock for the PLL, wherein the specific phase offset is among the at least one phase offset determined by the DPLL prior to the failure of the primary reference clock, the specific phase offset is between the primary reference clock and the secondary reference clock, and the secondary reference clock is among the plurality of reference clock signals.

10. The device of claim 9, wherein the at least one phase offset comprises phase offset between every pair of reference clock signals among the plurality of reference clock signals.

11. The device of claim 9, wherein the DPLL comprises a phase monitor circuit configured to determine the at least one phase offset among a plurality of reference clock signals.

12. The device of claim 9, wherein the PLL comprises a phase monitor circuit configured to:
receive the primary reference clock;
receive the secondary reference clock;
determine the specific phase offset; and
in response to failure of the primary reference clock, provide the specific phase offset to a phase detector in the PLL.

13. The device of claim 9, wherein:
the DPLL is configured to store the at least one phase offset in a plurality of registers prior to the failure of the primary reference clock; and in response to failure of the primary reference clock, the specific phase offset is loaded from one of the plurality of registers to the DPLL.

14. The device of claim 9, wherein the DPLL further comprise a clock selection circuit configured to:
   select a first reference clock signal among the plurality of reference clock signals as the primary reference clock for the PLL; and
   select a secondary reference clock among the plurality of reference clock signals as the secondary reference clock for the PLL.

15. A method comprising:
   receiving a plurality of reference clock signals;
   determining at least one phase offset among the plurality of reference clock signals;
   generating an output clock signal using a primary reference clock among the plurality of reference clock signals;
   determining a failure of a primary reference clock for a phase-locked loop (PLL); and
   in response to the failure of the primary reference clock, generating the output clock signal using a specific phase offset and a secondary reference clock for the PLL, wherein the specific phase offset is among the at least one phase offset determined prior to the failure of the primary reference clock, the specific phase offset is between the primary reference clock and the secondary reference clock, and the secondary reference clock is among the plurality of reference clock signals.

16. The method of claim 15, wherein determining the at least one phase offset comprises determining phase offset between every pair of reference clock signals among the plurality of reference clock signals.

17. The method of claim 15, further comprising:
   receiving the primary reference clock;
   receiving the secondary reference clock;
   determining the specific phase offset; and
   in response to failure of the primary reference clock, inputting the specific phase offset to a phase detector in the PLL.

18. The method of claim 15, further comprising storing the at least one phase offset in a plurality of registers prior to the failure of the primary reference clock, wherein in response to failure of the primary reference clock, the specific phase offset is loaded from one of the plurality of registers.

19. The method of claim 15, further comprising:
   selecting a first reference clock signal among the plurality of reference clock signals as the primary reference clock for the PLL; and
   selecting a secondary reference clock among the plurality of reference clock signals as the secondary reference clock for the PLL.

20. The method of claim 15, wherein determining the at least one phase offset is performed prior to a holdover state of the PLL.

* * * * *